United States Patent [19]

Corrado et al.

[11] 4,294,734
[45] Oct. 13, 1981

[54] LOW VISCOSITY UNSATURATED POLYESTER RESINS

[76] Inventors: Giovanni Corrado, 190, Via Gentile da Mogliano, Roma; Elvio Bertotti, 45, Corso Garibaldi, Colleferro, Roma; Bruno Sopino, 21, Via Belvedere, Colleferro, all of Italy

[21] Appl. No.: 107,709

[22] Filed: Dec. 27, 1979

[30] Foreign Application Priority Data

Dec. 29, 1978 [IT] Italy ............................ 31405 A/78
Jun. 29, 1979 [IT] Italy ............................ 23991 A/79

[51] Int. Cl.³ ...................... C08L 91/00; C08G 63/52
[52] U.S. Cl. .............................. 260/22 CB; 525/445; 528/303
[58] Field of Search ................... 525/445; 528/303; 260/22 R, 22 CB

[56] References Cited

U.S. PATENT DOCUMENTS

| | | | |
|---|---|---|---|
| 2,944,994 | 7/1960 | Singleton et al. | 528/303 X |
| 2,951,823 | 9/1960 | Sauer | 528/303 X |
| 3,511,792 | 5/1970 | Helm et al. | 260/22 R |
| 3,715,233 | 2/1973 | Harrier | 528/303 X |
| 3,721,642 | 3/1973 | Schalin et al. | 525/445 X |
| 3,736,278 | 5/1973 | Wada et al. | 528/303 X |
| 3,830,772 | 8/1974 | Busch et al. | 525/445 X |

*Primary Examiner*—Lucille M. Phynes
*Attorney, Agent, or Firm*—Hubbell, Cohen, Stiefel & Gross

[57] ABSTRACT

A low viscosity unsaturated polyester resin for making glass fiber reinforced products is described, which comprises an alkyd prepared by esterification of maleic anhydride and/or acid and/or fumaric acid, optionally together with phthalic anhydride and/or acid, with one or more glycols, essentially comprising dipropylene glycol, and further comprises 27–34% by weight (of the total resin) of an ethylenically unsaturated monomer copolymerizable with the alkyd, essentially chosen among styrene and vinyl toluene, the alkyd having a molecular weight/double bond factor between 200 and 360 and an amount of free functional groups between 80 and 100 mg of KOH per g of alkyd inclusive. The products obtainable from said resin by conventional processing techniques are also described. The low viscosity of the resin results in better workability and better behavior of the resin during molding while the mechanical properties of the finished products are very good.

5 Claims, No Drawings

LOW VISCOSITY UNSATURATED POLYESTER RESINS

BACKGROUND OF THE INVENTION (a) The Field of the Invention

The present invention relates to low viscosity unsaturated polyester resins essentially comprising an unsaturated polyester alkyd and an ethylenically unsaturated monomer copolymerizable with the alkyd. The present invention further relates to the glass fiber reinforced products which may be obtained from said polyester resins by the processes of vacuum injection moulding injection between compled moulds, vacuum moulding, low pressure pressure moulding, filament winding, and application by hand and by spraying, which are conventional for unsaturated polyesters.

(b) The Prior Art

The commercial products called "unsaturated polyester resins" obtained by mixing unsaturated polyester alkyd with a copolymerizable monomer; said known polyester resins however have a higher viscosity than the resins of the present invention, the monomer content and the elastic modulus and heat distortion temperature (HDT) of the hardened pure resin being equal. In other words, the applicant has surprisingly found, and this is an object of the present invention, that it is possible to obtain low viscosity unsaturated polyester resins having a low styrene content, adapted to the production of manufacts by the aforesaid processes which are conventional for unsaturated polyester resins.

SUMMARY OF THE INVENTION

An object of the present invention are therefore low viscosity unsaturated polyester resins for making glass fiber reinforced products vacuum injection molding injection between coupled molds, vacuum molding, low pressure pressure molding, filament winding, application by hand and by spraying, essentially comprising:

(A) an alkyd prepared by esterification of (a) maleic anhydride and/or acid and/or fumaric acid, alone or in association with phthalic anhydride and/or acid with (b) one or more glycols, essentially comprising dipropylenglycol, and at least (B) one ethylenically unsaturated monomer copolymerizable with (A), essentially chosen among styrene and/or vinyltoluene in an amount of 27-34% by weight of the total (A)+(B), said unsaturated polyester resins being characterized by the fact that an alkyd having a molecular weight/double bond factor comprised between 200 and 360 and an amount of free functional groups (constituted by hydroxyl groups+carboxyl groups), expressed as mg of KOH per g of alkyd, between 80 and 100 inclusive, is employed as alkyd (A).

The word "essentially" is to be construed, according to the present invention, as meaning a content higher than 90% by weight.

Preferably, maleic anhydride mixed with phthalic anhydride is used as componenet (a), 1,2-dipropylene glycol is used as component (b), and styrene is used as component (B).

The calculation of the molecular weight per double bond factor (P.M./C=C—), referred to in the description and in the claims, is illustrated hereinafter for the unsaturated polyester of Example 1, viz. a polyester based on maleic anhydride, phthalic anhydride and dipropylene glycol. The molecular weight of maleic anhydride is 98×0.8 mols=78; the molecular weight of phthalic anhydride is 148×0.2 mols=30; the molecular weight of dipropylene glycol is 134×1.0=134; the sum of the three members is 242 (78+30+134); by subtracting the weight of one mol water (18) 224 is obtained; the ratio of 224 to 0.8 (which represents the number of mols of double bond) is 280, which is the value sought (P.M./C=C— factor).

The lower content of styrene of the resins according to the invention, with respect to the conventional resins, the elastic modulus and heat distortion temperature (HDT) of the hardened pure resin being equal, produces not only ecological advantages, but, in association with the particular structure of the resins which are an object of the present invention it also and particularly produces the following advantages:

(a)-during the moulding:
 (a.1) less "washing" of the glass fibres; the term "washing" means an excessively rapid removal of the binder and a partial removal of the finishes;
 (a.2) better wettability of the glass fibers;
 (a.3) less chemical attack of the mould surface;
 (a.4) less heat developed during hardening;
 (a.5) less shrinkage during hardening;

(b)-better mechanical properties of the finished product, particularly:
 (b.10) lower inner tensions;
 (b.2) higher fatigue resistance;
 (b.3) higher impact resistance.

The process for the preparation of the unsaturated polyester resins which are an object of the present invention does not differ from those generally known in the art, although attention must be paid to the fact that the amounts of the reagents used for producing the alkyd must be chosen in such a way as to obtain an alkyd having a molecular weight/double bonds factor comprised between 200 and 360 and having an amount of free functional groups (constituted by hydroxyl groups+carboxyl groups), expressed as mg of KOH per g of alkyd, between 80 and 100 inclusive. The polyesterification reaction is, as usual, carried out at temperatures comprised between 150° and 250° C. in the absence or in the presence of aromatic solvents, such as xylene, toluene, etc., having the function of azeotropic agents, and in an atmosphere of an inert gas such as nitrogen, carbon dioxide, etc. At temperatures comprised between 30° and 190° C., viz. after cooling the reaction mixture once the predetermined acid number has been attained, the usual amounts of conventional cross-linking inhibitors, such as quinones, hydroquinones, quaternary ammonium salts, nitrophenols, sulfonic acids, etc. alone or mixed with one another, may be added.

In particular, in the non limitative case that styrene is employed as copolymerizable monomer, the following viscosity values expressed as cps at 25° C., as a function of the styrene content in the totale alkyd+styrene, are obtained

| % by weight of styrene on the total | viscosity ± 10% at 25° C. |
|---|---|
| 27 | 650 cps |
| 28 | 550 cps |
| 31 | 365 cps |
| 34 | 200 cps |

A further object of the present invention are the products obtained from the unsaturated polyester resins hereinbefore described, by vacuum a injection molding, injection between compled molds, vacuum molding, low pressure pressure molding, filament winding, applications by hand and by spraying, which are conventional processes for unsaturated polyester resins. For the applications in the open, such as e.g. filament winding and applications by hand and by spraying, it may be convenient to add to the unsaturated polyester resins which are one of the objects of the present invention, a compound which permits the hardening of the resin even in the presence of the oxygen of the air, such as e.g. at least one of those claimed in the Italian patent application No. 26109 A/78 filed on July 26, 1978.

As to the vacuum injection moulding process, the applicant has found a particular technique which is extremely well adapted to the production of manufacts from the unsaturated polyester resins which are the objects of the present invention. Said process, which is a further object of the present invention, consists of introducing, under a moderate pressure, preferably up to 12 atm, the liquid polyester resin, containing the alkyd (A), the copolymerizable monomer (B), as well as the conventional accelerators and catalysts, into the cavity of a mold into which the chosen fiber has already been introduced and in allowing the polymerization to occur according to conventional methods.

Conveniently, said injection technology is preferably carried out in the following way: two layers of glass fiber mat are placed on the male half-mold of a male-female mold made of glass reinforced resin on which a wax layer is applied to facilitate the formation of the finished product. After closing the two half-molds by coupling the female to the male and sealing the contour (which is carried out with the help of mechanical clamps) the injection is carried out through a bore provided in the central portion of the bottom of the female half-mold. The injection is preferably carried out by using dosing pumps which dose both the resin and the catalyst. To obtain the highest mechanical properties, the polyester resin should have low viscosity and therefore the content of monomer (e.g. styrene) of the resin must be as low as possible, anyway comprised between the percentages (27–34% by weight) herein claimed.

Conveniently the injection stage lasts for a period of time sufficient (from 30 sec. to 2 hours) to promote at the same time the discharge of the air included in the mould through appropriate discharge bores. After having gelled the resin by conventional methods and after a period of about from 2 min. to 6 hours, the mold is opened and the molded material, extracted.

The following examples are illustrative and are not intended to limit the present invention in any way. The parts and percentages are by weight.

EXAMPLE 1

Γparts of maleic anhydride and 52 parts of phthalic anhydride are reacted with 138 parts of 1,2-dipropylene glycol by the usual methods at 200° C. in an inert gas atmosphere. The reaction is stopped when an acid number of 40 mg KOH/g of alkyd is reached. An alkyd is thus obtained having a molecular weight per double bond factor equal to 357 and an amount of free functional groups of 80 mg KOH/g of alkyd. 20 parts of said alkyd are mixed with 10 parts of styrene containing 0.05 parts of toluene-hydroquinone. The viscosity at 25° C. of said resin is 200 cps. The heat distortion temperature (according to the norm ASTM D 648) of the hardened resin is 74° C.

EXAMPLE 2

The production of a open tub having a diameter of 126 cm, and an average depth of 60 cm, and a capacity of 0.6 m$^3$, by the injection technology, is described.

To this purpose a male-female mold made of glass reinforced resin is used. A layer of wax is applied on the mold to facilitate the extraction of the finished product. Two layers of glass fiber mat having a weight of 450 grams/m$^2$ are placed on the male half-mould. The total weight of the glass fibre is 5 kg.

The two half-molds are then closed by coupling the female to the male and sealing the contour with the help of mechanical clamps. At this point the injection is carried out through a bore provided in the central portion of the female half-mould. The injection is carried out using dosing pumps which dose both the resin and the catalyst.

The polyester resin should have a low viscosity to be injected while in order to achieve the highest mechanical properties the styrene monomer content of the resin should be as low as possible.

Therefore the resin described in Example 1 is used, which resin has an optimal viscosity for the injection, viz. 200 cp at 25° C.; yet its styrene content is 33% by weight.

For the injection are used 11 kg of said resin to which 0.6 of cobalt octoate containing 6% of cobalt metal have been added as a polymerization accelerator and 2% of methylethylketone peroxide has been added as hardener.

The injection stage is then carried out, which lasts about 4 min, while the discharge of the air included in the mold through appropriate discharge bores is concurrently promoted. The resin gels in about 10–11 min and after about 1 hour the finished tub is extracted after opening the mold. A number of samples are taken from the tub to determine the mechanical properties. The results are given in the following Table 1:

TABLE 1

| | Tub made from the resin of Example 1 |
|---|---|
| % of glass by weight | 30 |
| Traction breaking load (ASTM D 790) | 1300 kg/cm$^2$ |
| Bending breaking load (ASTM D 790) | 2350 kg/cm$^2$ |
| Impact resistance Izod (ASTM D 256) | 230 kg cm/cm |

EXAMPLE 3

(An example which shows that a conventional commercial resin cannot be used for the purposes of the present invention). A conventional commercial unsaturated polyester resin, prepared by the same technique described in Example 1, but using 0.4 mols of maleic anhydride, 0.6 mols of phthalic anhydride and 1.1 mol of propylene glycol, is used for the same purpose as in Example 2. The reaction is stopped when an acid number equal to 40 mg KOH/g of alkyd is reached.

20 parts by weight of said alkyd are mixed, as in Example 2, with 10 parts by weight of styrene containing 0.05 parts of toluene-hydroquinone. The viscosity of the resin thus obtained at 25° C. is 600 cp.

Attempts are made to carry out an injection into the mold described in Example 2, by the technique described in the example. The resin cannot be injected because its viscosity is too high.

EXAMPLE 4

(An example which shows that a conventional commercial resin, suitably modified to lower the viscosity to the same level of the resin of Example 1, can be used for the injection technology but furnishes products having greatly inferior properties).

The same conventional alkyd described in Example 3 is used, but 20 parts by weight of this alkyd are diluted with 15.1 parts by weight of styrene containing 0.05 parts of toluene-hydroquinone. The resin thus obtained has a styrene content of 43% and a viscosity at 25° C. of 200 cp.

The resin is injected into the same mold of Example 2 which contains the same glass and by the same technique therein described. The mechanical properties are determined on samples of the product obtained, and are as tabulated in the following Table 2.

TABLE 2

|  | Tub made from the resin of Example 4 |
| --- | --- |
| % of glass by weight | 30 |
| Traction breaking load (ASTM D 790) | 1000 kg/cm$^2$ |
| Bending breaking load (ASTM D 790) | 1700 kg/cm$^2$ |
| Impact resistance Izod (ASTM D 256) | 150 kg cm/cm |

By comparing the values of Table 1 and Table 2 it is seen that the product obtained from the resin of the present invention (Examples 1 and 2) has mechanical resistance values values which are 30–50% higher than those obtained from the conventional resin of Example 4.

EXAMPLE 5

The resin obtained according to Example 1 is used to mold at room temperature a lorry cabin door reinforced with 33% of glass fiber continuous filament mat by the injection between coupled molds technology described in Example 2. The measurement of the mechanical characteristics carried out according to the ASTM norms on test samples taken from the product have given the following value:
 * Bending breaking load (ASTM D 790) 2200 kg/cm$^2$.

EXAMPLE 6

780 parts of maleic anhydride and 300 parts of phthalic anhydride are reacted with 1360 parts of 1,2-dipropylene glycol by the usual methods at 190° C. in an inert gas atmosphere. The reaction is stopped when an acid number of the alkyd equal to 45 mg KOH/g of alkyd is reached. An alkyd is thus obtained having a molecular weight per double bond factor equal to 280 and an amount of free functional groups of 90 mg KOH/g of alkyd.

2000 parts of the alkyd are mixed with 900 parts of styrene containing 0.6 parts of hydroquinone. The viscosity at 25° C. of the resin is 340 cps.

The heat distortion temperature of the hardened resin, measured according to the norm ASTM D 648, is 90° C.

EXAMPLE 7

The resin obtained according to Example 6 is used to mold by the conventional vacuum cold molding technique, a sandwich panel having a total thickness of 100 mm constituted by two outer layers of glass reinforced resin containing 30% of glass fiber in the form of a chopped strand mat having a weight of 450 g/m$^2$ and a thickness of 3 mm and 94 mm of expanded polyurethane having a density of 40 kg/m$^3$.

The mechanical characteristics are determined on test samples taken from the glass reinforced layers of the product and furnish the following values:
 * Bending breaking load (ASTM D 790) 2300 kg/cm$^2$
 * Impact resistance (ASTM D 256) 280 kg cm/cm.

EXAMPLE 8

71 parts by weight of maleic anhydride and 42 parts by weight of phthalic anhydride are reacted with 134 parts by weight of 1,2 dipropylene glycol by the usual methods at 195° C. in an inert gas (nitrogen) atmosphere. The reaction is stopped when an acid number equal to 43 mg KOH/g of alkyd is reached. An alkyd is thus obtained having a molecular weight per double bond factor equal to 332 and an amount of free functional groups of 86 mg KOH/g of alkyd. 50 parts of said alkyd are mixed with 23 parts of styrene containing 0.01 parts of toluene-hydroquinone. The viscosity of 25° C. of the resin is 350 cps. The heat distortion temperature (ASTM D 648) is 85° C.

EXAMPLE 9

The resin obtained according to Example 8 is used to mold at room temperature a motor car bumper reinforced with 35% of glass fiber continuous filament mat using the injection between coupled molds technology described in Example 2.

The determination of the mechanical characteristics according to the ASTM norms on test samples taken from the product gives the following characteristics:
 * Bending breaking load (ASTM D 730) 2500 kg/cm$^2$
 * Izod impact resistance (ASTM D 256) 220 kg/cm$^2$.

EXAMPLE 10

780 parts of maleic anhydride and 300 parts of phthalic anhydride are reacted with 1360 parts of 1,2-dipropylene glycol by the usual methods at 190° C. in an inert gas atmosphere. The reaction is stopped when the acid number of the alkyd is 45 mg KOH/g of alkyd. An alkyd is thus obtained having a molecular weight per double bond factor equal to 280 and an amount of free functional groups of 90 mg KOH/g of alkyd.

2000 parts of said alkyd are mixed with 900 parts of styrene containing 0.6 parts of hydroquinone. The viscosity at 25° C. of said resin is 340 cps. The heat distortion temperature (HDT) of the hardened resin, measured according to the norm ASTM D 648, is 90° C.

EXAMPLE 10a

The resin obtained according to Example 10 is used to mould by the conventional cold vacuum moulding technique a sandwich panel having a total thickness of 100 mm constituted by two external layers of glass reinforced resin, containing 30% of chopped strand mat having a weight of 450 g/m$^2$ and a thickness of 3 mm and 94 mm of expanded polyurethane having a density of 40 kg/m³.

Mechanical tests have been carried out on test samples obtained from the glass reinforced layers of the product, which have shown the following characteristics:
* Bending elastic modulus (ASTM D 790) 67,000 kg/cm²
* Bending breaking load (ASTM D 790) 2,300 kg/cm²
* Impact resistance (ASTM D 256) 100 kg cm/cm.

EXAMPLE 10b

The resin obtained according to Example 10 is used, after addition thereto of 5 parts of cetyl alcohol and 5 parts of stearic acid per 100 parts of resin, to produce by the conventional filament winding technique a tank reinforced with 50% of fiber glass continuous filament yarn with a winding angle of 50°.

Mechanical tests carried out according to the ASTM norms on test samples taken from the product thus obtained, have shown the following characteristics:
* Bending elastic modulus (ASTM D 790) 150,000 kg/cm²
* Bending breaking load (ASTM D 790) 4,000 kg/cm²

We claim:

1. Low viscosity unsaturated polyester resins for making glass fiber reinforced products by the injection between coupled moulds, vacuum moulding, vacuum injection moulding, low pressure pressure moulding, filament winding, application by hand and by spraying, essentially comprising:
    (A) an alkyd prepared by esterification of
        (a) a compound selected from the group consisting of maleic anhydride, maleic acid, fumaric acid, and mixtures thereof alone or in association with phthalic anhydride or phthalic acid, with
        (b) one or more glycols essentially comprising dipropylene glycol, and at least
    (B) one ethylenically unsaturated monomer copolymerizable with (A), selected from the group consisting of styrene and vinyltoluene, in an amount of 27–34% by weight of the total (A)+(B), said unsaturated polyester resins being characterized by the fact that said alkyd (A) has a molecualr weight/double bond factor between 200 and 360 and has an amount of free functional groups constituted by hydroxyl groups+carboxyl groups, between 80 and 100, inclusive expressed as mg of KOH per g of alkyd (A).

2. Unsaturated polyester resins according to claim 1, wherein styrene is employed as said copolymerizable monomer, characterized by the fact that said resin have the following viscosity values expressed as cps at 25° C. as a funtion of the styrene content in the total alkyd+styrene

| % by weight of styrene on the total | Viscosity ± 10% at 25° C. |
| --- | --- |
| 27 | 650 cps |
| 28 | 550 cps |
| 31 | 365 cps |
| 34 | 200 cps |

3. Unsaturated polyester resins according to either claim 1 or 2, characterized by the fact that maleic anhydride mixed with phthalic anhydride is used as component (a), 1,2-dipropylene glycol is used as component (b), and styrene is used as component (B).

4. A process for making products from the unsaturated polyester resins according to any of claims 1 or 2 reinforced with fibers, by vacuum injection moulding, characterized in that the liquid polyester resin is introduced, together with conventional accelerators and catalysts, under a moderate pressure, into the cavity of a mould into which the chosen fiber has already been introduced, and is polymerized therein by conventional methods.

5. Polyester resins according to either claims 1 or 2, wherein said resins reinforced with fibers are processed into final products by a process selected from vacuum injection moulding, injection between coupled moulds, low pressure pressure moulding, filament winding, applications by hand and by spraying processes, which are conventional for unsaturated polyester resins.

* * * * *